United States Patent [19]

Shelor

[11] Patent Number: 5,525,053
[45] Date of Patent: Jun. 11, 1996

[54] METHOD OF OPERATING A COMBINED CYCLE POWER PLANT

[75] Inventor: F. Mack Shelor, Midlothian, Va.

[73] Assignee: Wartsila Diesel, Inc., Annapolis, Md.

[21] Appl. No.: 352,124

[22] Filed: Dec. 1, 1994

[51] Int. Cl.$^6$ ........................................................ F23D 14/00
[52] U.S. Cl. .................... 431/5; 122/7 R; 122/1 R; 431/2; 431/11; 431/12
[58] Field of Search ........................... 431/5; 122/7 R, 122/1 R; 123/2

[56] References Cited

U.S. PATENT DOCUMENTS

| | | |
|---|---|---|
| 3,788,796 | 1/1974 | Krippene et al. . |
| 3,808,805 | 5/1974 | Mirmotes . |
| 3,884,194 | 5/1975 | Grosseau . |
| 3,904,349 | 9/1975 | Peterson et al. . |
| 4,380,202 | 4/1983 | LaRue et al. . |
| 4,403,941 | 9/1983 | Okiura et al. . |
| 4,412,810 | 11/1983 | Izuha et al. . |
| 4,496,306 | 1/1985 | Okigami et al. . |
| 4,501,233 | 2/1985 | Kusaka . |
| 4,545,307 | 10/1985 | Morita et al. . |
| 4,572,110 | 2/1986 | Haefflich . |
| 4,654,001 | 3/1987 | LaRue et al. . |
| 4,706,612 | 11/1987 | Moreno et al. . |
| 4,739,713 | 4/1988 | Vier et al. . |
| 4,748,919 | 6/1988 | Campobenedetto et al. . |
| 4,790,743 | 12/1988 | Leikert et al. . |
| 4,799,461 | 1/1989 | Shigenaka et al. . |
| 4,807,541 | 2/1989 | Masai et al. . |
| 4,836,772 | 6/1989 | LaRue . |
| 4,838,185 | 6/1989 | Flament . |
| 4,881,474 | 11/1989 | Okada et al. . |
| 4,907,962 | 3/1990 | Azuhata et al. . |
| 4,915,619 | 4/1990 | LaRue . |
| 4,928,635 | 5/1990 | Shelor . |
| 5,022,849 | 6/1991 | Yoshii et al. . |
| 5,067,419 | 11/1991 | Kobayashi et al. . |
| 5,090,339 | 2/1992 | Okiura et al. . |
| 5,092,761 | 3/1992 | Dinicolantonio . |
| 5,113,771 | 5/1992 | Rini et al. . |
| 5,129,333 | 7/1992 | Frederick et al. . |
| 5,129,818 | 7/1992 | Balsiger . |
| 5,133,298 | 7/1992 | Ahnger . |
| 5,151,256 | 9/1992 | Kato et al. . |
| 5,190,451 | 3/1993 | Goldbach . |
| 5,199,355 | 4/1993 | LaRue . |
| 5,199,357 | 4/1993 | Garcia-Mallol . |
| 5,215,455 | 6/1993 | Dykema . |
| 5,224,334 | 7/1993 | Bell . |
| 5,231,937 | 8/1993 | Kobayashi et al. . |
| 5,236,354 | 8/1993 | Goldbach et al. ............... 431/5 X |
| 5,263,426 | 11/1993 | Morita et al. . |
| 5,299,930 | 4/1994 | Weidman . |

OTHER PUBLICATIONS

Osborne et al., "Aplicaciones del Ciclo Combinado de Carbon y Diesel" (Sep. 1992) (Spanish).
Osborne et al., "Low Cost, Integrated Cogeneration" (Sep. 1992) (English translation).

*Primary Examiner*—Larry Jones
*Attorney, Agent, or Firm*—Venable, Baetjer, Howard & Civiletti

[57] ABSTRACT

A method of using internal combustion engine exhaust in a combined cycle power plant is disclosed, wherein the quality and distribution of exhaust to the boiler space of a steam generated electric power plant is controlled to achieve greater system efficiencies. Outside air is blended only with that portion of the exhaust that passes through the burner ports as secondary or higher level combustion gas. The remainder of the exhaust is provided to the boiler space by a route other than through the burner. The highest overall system efficiencies are achieved where the amount of outside air blended with the portion of exhaust that passes through the burner is such that the blend contains about the minimum amount of oxygen required for complete and stable combustion of the selected fuel, where a substantial percentage of the total exhaust is routed to the boiler space by a route other than through the burner, and where the amount of fuel is sufficient to achieve a desired boiler entering temperature upon its combustion.

24 Claims, 1 Drawing Sheet

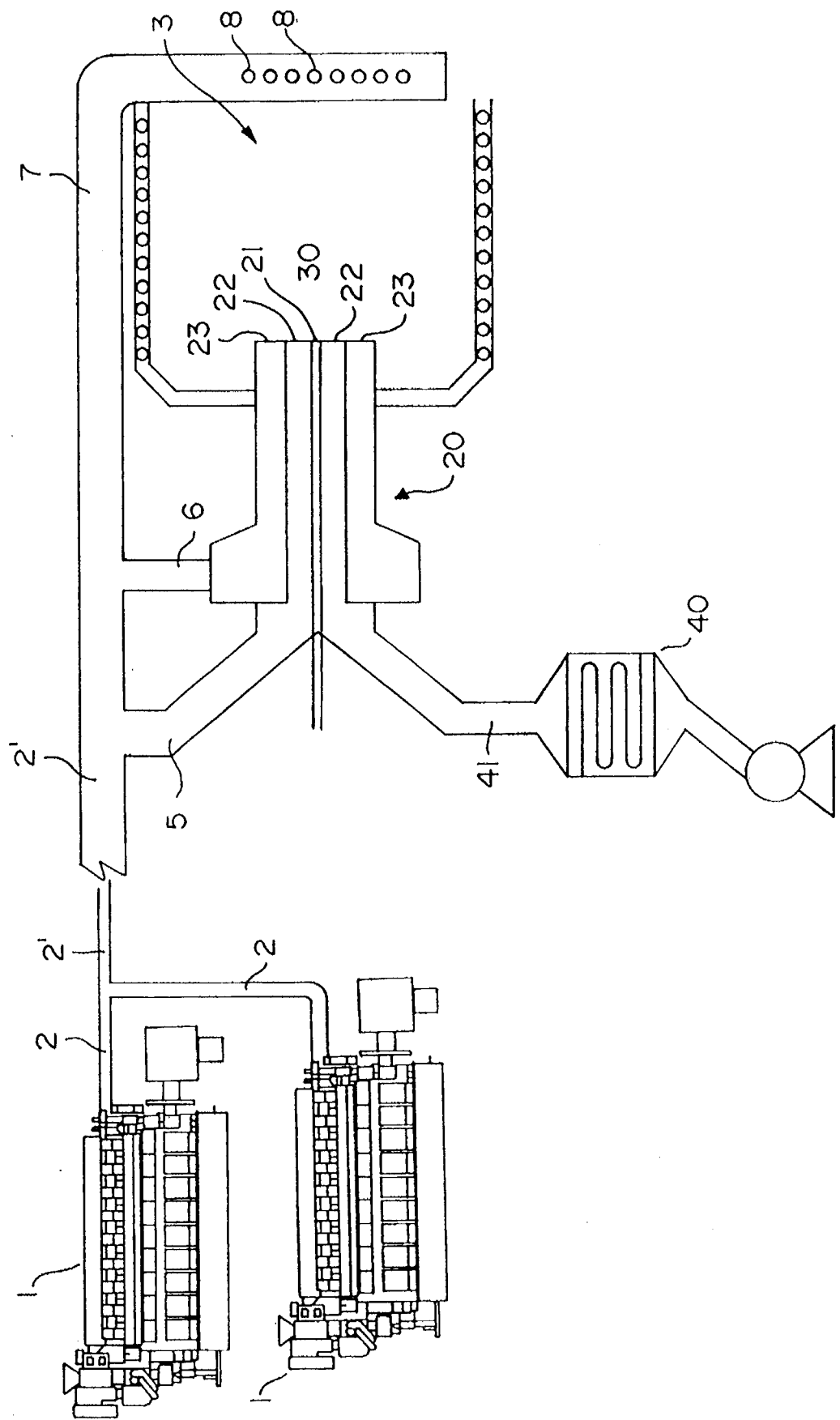

METHOD OF OPERATING A COMBINED CYCLE POWER PLANT

BACKGROUND OF THE INVENTION

The present invention relates to the use of internal combustion engine exhaust in combined cycle power plants. More particularly, the present invention relates to achieving greater system efficiencies by controlling the quality and distribution of exhaust to the boiler space of a typical steam generated electric power plant.

Where power plant design is concerned, efficiency provides a useful measure of system performance. As the power plant converts energy from one form to another, losses are inevitable. Where the designer reduces such losses, or even transforms the by-products or waste of certain processes into available energy sources, the overall efficiency of the system naturally will increase.

It is known in the art that efficiencies in power generation may be achieved by recycling internal combustion engine exhaust as secondary combustion gas and as overfire or underfire air in a typical coal-fired steam generated power plant. In my U.S. Pat. No. 4,928,635, I disclose such a system. One of the objects of that invention was to make the heat energy of the exhaust available to generate steam. Thus, efficiencies were achieved simply by converting what would otherwise be waste into productive energy. At that time, I realized that it was necessary to raise the temperature of the exhaust in order to produce high quality steam. I suggested that retiring a blend of exhaust containing about 13% oxygen and preheated air as secondary combustion gas would be a suitable method for achieving that result. I suggested further that the total flow of exhaust into the boiler preferably should be about 40–70% of the total gas flow into the boiler.

Upon further investigation, I discovered that greater overall system efficiencies could be achieved by controlling the amount of oxygen at key locations within the burner, and by routing substantially higher proportions of exhaust to the boiler space directly, as opposed to routing it as secondary or higher level combustion gas, thereby lowering the amount of supplementary firing required in the boiler. The total flow of exhaust into the boiler should constitute a higher percentage of the total gas flow into the boiler than I previously had suggested in order to take full advantage of the thermal energy of the exhaust and to avoid introduction into the boiler, at least as much as possible, of lower temperature gases. The method of the present invention reflects that discovery.

SUMMARY OF THE INVENTION

Where internal combustion engine exhaust is used to generate steam for either process requirements or for the production of electricity, it may be necessary to increase the temperature of the exhaust gas from the internal combustion engine to levels which are appropriate for high quality steam production. Retiring the exhaust-burning additional fuel in its presence-accomplishes this result. Combustion of the fuel raises its temperature and that of the surrounding and downstream exhaust, as well as any other gases present.

The amount of fuel that must be burned to raise the temperature of the exhaust depends, of course, on the type of fuel being used. It also depends upon the total amount of gas that must be raised to temperature and the initial temperature of the gas. Greater overall system efficiencies will be realized where the heat added to the system to meet the steam conditions, other than that provided by the exhaust, is minimized, since this heat represents fuel that must be burned. The amount of heat that must be added to the system generally increases as the amount of gas within the system increases.

Fuel must be burned in the presence of oxygen. Generally, it is necessary to provide outside air containing a percentage of oxygen to the burner as secondary combustion gas, thus ensuring that sufficient oxygen will be available to achieve complete and stable combustion of the fuel. However, since the outside air necessarily must enter the system, its temperature also must be raised to satisfy the steam conditions. The more outside air is used, the more heat must be added to the system in the form of burned fuel.

Where exhaust is used as a secondary combustion gas, its greater temperature relative to outside air translates to a reduction in the amount of heat that must be added to satisfy steam conditions. Although the exhaust generally contains some oxygen, it may be insufficient to achieve complete and stable combustion of the fuel. Accordingly, some outside air must be blended with the exhaust to bring the level of oxygen within the blend to an amount sufficient to achieve complete and stable combustion of the fuel provided through the burner. The amount of oxygen necessary to achieve complete and stable combustion, of course, will depend also on the volatility of the chosen or readily available fuel.

Raising the level of oxygen for the entire cross-section of exhaust would require the addition of a substantial amount of outside air. To reduce the amount of outside air entering the boiler, outside air is blended only with that portion of the exhaust that passes through the burner ports as secondary or higher level combustion gas. The remainder of the exhaust is provided to the boiler space by a route other than through the burner. The highest overall system efficiencies are achieved where the amount of outside air blended with the portion of exhaust that passes through the burner is such that the blend contains about the minimum amount of oxygen required for complete and stable combustion of the selected fuel, where a substantial percentage of the total exhaust is routed to the boiler space by a route other than through the burner, and where the amount of fuel is sufficient to achieve a desired boiler entering temperature upon its combustion.

Greater overall system efficiencies may be achieved by practicing the invention regardless of the initial oxygen content of the exhaust. Likewise, greater efficiencies may be achieved regardless of the specific fuel chosen. The invention provides a method of operation which by its very nature is flexible, adapting itself to whatever potential sources of energy may be available. Existing combined cycle generation plants may be modified at a reasonable cost to permit performance of the method. Likewise, wherever an existing steam generated electric power plant may be adapted for combined cycle duty, the method may be practiced.

These and other advantages of the present invention, as well as a preferred method of practicing the invention, will best be understood in view of the appended FIG. and the discussion that follows.

A BRIEF DESCRIPTION OF THE DRAWING

The FIG. is a schematic showing the most basic elements common to typical combined cycle generation plants.

A DETAILED DESCRIPTION OF THE PREFERRED MANNER OF PRACTICING THE INVENTION

To demonstrate the preferred method of the invention, I now turn to the FIG. The FIG. shows the most basic elements common to typical combined cycle generation plants. The plant employs at least one internal combustion engine 1. The engine may be any internal combustion engine, but preferably is a diesel engine. Such an engine may be adapted to burn natural gas, light fuel oil, or heavy fuel oil, among other fuels. Branches 2 and 2' route exhaust from the engines to a typical steam generated electric power plant, all elements of which are not shown in the FIG. for clarity. Shown in the FIG. is a boiler space 3, about the periphery of which are disposed steam tubes 4. Water or steam circulates within the steam tubes 4 about the periphery of the boiler space 3. It is at this interface that heat is exchanged between the boiler space 3 and the steam in the steam tubes 4. Exposure to the hot gases within the boiler space 3 causes the temperature of the steam within the steam tubes 4 to rise. The superheated steam is then circulated to a steam turbine generator (not shown), where most of the thermal energy of the steam is transformed into electricity.

Only a portion of the exhaust enters the boiler space through one or more outlets of the burner. As shown in the FIG., branches 5 and 6 each route a portion of the exhaust to the burner 20. Branch 7 routes the remainder of the exhaust to the boiler space 3 directly, bypassing the burner 20. This portion of the exhaust enters the boiler space 3 through ports or nozzles 8.

The burner 20 includes a primary outlet or nozzle 21. The primary outlet 21 is adapted to deliver fuel to a combustion zone 30. The fuel may be coal, either micronized or pulverized, liquified bituminus fuel, heavy fuel oil, residual oil, ormulsion, or any other suitable fuel. Selection of an appropriate burner depends on the choice of fuel, the nature of the steam generated electric power plant, and the given steam conditions. Commercially available burners, such as those manufactured by Babcock & Wilcox, are suitable where the burner provides for mixing and blending of fuel and oxygen, maintaining appropriate oxygen levels for the combustion of the selected fuel at the burner tip, and delivering secondary or higher level combustion gases. The Babcock & Wilcox XCL burner, as well as adaptations and subsequent generations of such burners, are most preferred. Where coal is the fuel, the average oxygen level at the burner tip is preferably about 14.5 percent. Where heavy fuel oil or natural gas is used, the level is preferably about 14.1 percent and 13 percent, respectively.

Preferably, the fuel is blended with an amount of air sufficient to carry or transport the fuel. Benefits may be enhanced by endeavoring to maintain a reducing atmosphere in a portion of the combustion zone 30, and permitting combustion to proceed in stages where secondary, tertiary, or higher level combustion gas streams supply the oxygen necessary to complete successive stages of combustion.

Exhaust routed by branches 5 and 6 eventually enters the boiler space through burner outlets 22 and 23. Preferably, the burner exhaust flow is at most 40 percent of the total exhaust flow that eventually will be delivered to the boiler space 3. Most preferably, the burner exhaust flow is about 20 percent of the total exhaust flow that eventually will be delivered to the boiler space 3. The burner exhaust flow functions as secondary and tertiary combustion gas, which is delivered in circumferential rings about the primary burner outlet 21, and provides shape, stability, and oxygen to the flame.

The oxygen content of the exhaust routed by branches 5 and 6 is normally insufficient to achieve complete and stable combustion of the fuel. Additional oxygen must be supplied to the exhaust flow. This oxygen is supplied by blending outside air with the exhaust routed by branches 5 and 6. Preferably, the outside air is preheated by passing it through a steam coil air heater 40 before routing it by branch 41 to the burner 20. Preheating reduces the amount of heat which subsequently must be added to raise the temperature of air, and thus reduces the amount of fuel that must be burned. Optimum efficiency will be achieved where the amount of outside air that is blended with the exhaust flow is such that it supplies the minimum oxygen supplement necessary to achieve complete and stable combustion of the fuel, which translates generally to the minimum amount of outside air necessary to achieve the same purpose.

Exhaust routed by branch 7 bypasses the burner 20. The bypass exhaust flow enters the boiler space 3 downstream of the combustion zone 30 and preferably is delivered to the boiler space 3 through outlets or nozzles 8 in a wall or walls of the boiler space 3. After the bypass exhaust flow enters the boiler space 3, it mixes with the combustion products and the burner exhaust flow (now at an elevated temperature). Upon mixing, the gases tend toward a uniform average boiler entering temperature. Preferably, the bypass exhaust flow is at least about 60 percent of the total exhaust flow that will be delivered to the boiler space 3. Most preferably, the bypass exhaust flow is at least about 80 percent of the total exhaust flow that will be delivered to the boiler space 3. Optimum efficiencies will be achieved where the average boiler entering temperature is the minimum necessary to achieve the given steam conditions.

The method of the invention can be demonstrated further with reference to a simple system comprising the following components and operational constraints or characteristics:

(1) one VASA 18V46 diesel engine generator at full load on No. 6 fuel oil;

(2) a boiler fired on No. 6 fuel oil. Fresh combustion air is added to the fuel to maintain 14.6 percent oxygen (wet weight basis) in burner windbox. Burner fired to maintain 10 percent minimum excess oxygen at burner exit, resulting in approximately 2800 degrees F. firing temperature leaving the burner. Windbox temperature maintained at approximately 563 degrees F.

(3) steam generation based on 300 degrees F. economizer outlet temperature, no blowdown. Steam generated at conditions 1300 psig/950 degrees F. feed water;

(4) fuel input based on No. 6 fuel oil, LHV basis, 17,233 BTU/lb.

(5) ambient conditions 86 degrees F., 60 percent R.H., sea level.

Typical operating parameters for this system are provided in the following Table:

| | No. 6 Oil Fired Diesel Combined Cycle Typical Operating Parameters | | | | |
|---|---|---|---|---|---|
| Portion of Diesel Exhaust Mass Flow to Burner | 100% | 80% | 60% | 40% | 20% |

-continued

| No. 6 Oil Fired Diesel Combined Cycle Typical Operating Parameters | | | | | |
|---|---|---|---|---|---|
| Portion of Total Boiler Gas Mass Flow from Burner | 100% | 83.6% | 65.7% | 45.4% | 24.0% |
| Portion of Total Boiler Gas Mass Flow Overfire | 0% | 16.4% | 34.3% | 54.6% | 76.0% |
| Diesel Exhaust $O_2$ (Vol. % wet) | 11.6% | 11.6% | 11.6% | 11.6% | 11.6% |
| Windbox $O_2$ | | | | | |
| (Vol. % wet) | 13.1% | 13.1% | 13.1% | 13.1% | 13.1% |
| (Wt. % wet) | 14.6% | 14.6% | 14.6% | 14.6% | 14.6% |
| $O_2$ at Burner Exit (Vol. % wet) | 1.2% | 1.2% | 1.2% | 1.2% | 1.2% |
| $O_2$ at Econ. Outlet (Vol. % wset) | 1.2% | 2.9% | 4.8% | 6.9% | 9.1% |
| Gass Temp. at Boiler Inlet (°F.) | 2800 | 2484 | 2126 | 1705 | 1233 |
| Gas Temp at Econ Inlet (°F.) | 300 | 300 | 300 | 300 | 300 |
| Fresh Air to total Diesel Exhaust Flow Ratio (lb/lb) | 0.218 | 0.174 | 0.131 | 0.082 | 0.043 |
| Steam Produced per lb of Burner Fuel (lb steam/lb fuel) | 14.96 | 15.32 | 15.91 | 17.19 | 20.77 |
| Steam Produced per Diesel KW Output (lb/kW) | 11.60 | 9.48 | 7.40 | 5.23 | 3.20 |
| Steam Produced per lb of Diesel Exhaust (lb steam/lb exhaust) | 0.776 | 0.635 | 0.496 | 0.351 | 0.214 |
| Gross Boiler Efficiency (%) | 108% | 111% | 115% | 124% | 150% |

Thus, for given steam conditions, optimum efficiencies are achieved where the addition of fuel and air is minimized or, conversely, where a substantial portion of the exhaust from the internal combustion engine enters the boiler space by a route other than through the burner.

The proposed system may be understood more clearly if one treats the boiler as a separate component from the internal combustion engine. The exhaust contributes a fixed amount of heat to the boiler and fuel is added to this fixed level to enable the boiler to produce steam of a given quality. Based on the amount of fuel required, which amount necessarily is a function of the quality and nature of the fuel, an amount of oxygen must be made available in and around the combustion zone to achieve complete and stable combustion of the fuel. As shown in the Table, the point of greatest apparent boiler efficiency is the point where the minimum amount of fuel is added to satisfy the steam conditions. The minimum boiler entering temperature (maximum bypass) in this example is approximately 1230 degrees Fahrenheit, providing an apparent boiler efficiency of 150 percent.

With a goal to provide an efficient combined system for large power generation using diesel engines as the base and retaining the fuel flexible characteristics of diesel combined cycle systems, a preferred arrangement with which the method may be practiced employs six VASA 18V46 diesels in combination with a three pressure reheat heat recovery steam generator. Nonetheless, recognizing that the diesel exhaust provides a fixed quantity of recoverable heat and that fuel may be added to the exhaust in order to overcome boiler pinch points for each steam cycle, it is clear that an entire array of potential power plant sizes using reheat or non-reheat steam turbines may be created.

Heavy fuel oil is provided to the diesels at 885.8 MBTU/H/17233.0 BTU/LB. The total diesel generator output is 90.7 MW. The burner exhaust flow is 271.3 KLB/H at 660 degrees Fahrenheit. The bypass exhaust flow is 1085.4 KLB/H, or about 80 percent of the total exhaust flow that will enter the boiler space, at 660 degrees Fahrenheit. Outside air at 88 degrees and relative humidity of 80 percent is preheated to 300 degrees Fahrenheit and is delivered to and blended with the burner exhaust flow at 48.25 KLB/H.

No. 6 heavy fuel oil is provided to the burner at 231.1 MBTU/H/17233.0/LB. Alternative fuels include natural gas or light fuel oil. The use of orimulsion or coal, of course, would require some change in the steam system portion of the plant. Generally, where more difficult fuels are involved, the three pressure boiler cannot be used and a two pressure system may be employed. Particularly dirty fuels may require that specific environmental control measures be employed after the steam system portion of the plant.

Under these conditions, a boiler entering temperature of 1230 degrees Fahrenheit and a gross heat rate of 7016.6 BTU/KWH (lower heating value, gross plant output) is achieved. The gross plant output and net output are 130.6 MW and 126.7 MW, respectively, with the steam turbine operating at 1465 psig/1000 degrees Fahrenheit/1000 degrees Fahrenheit to produce 39.9 MW.

Where the bypass exhaust flow is decreased to 60 percent, a higher gross heat rate of 7172.51 BTU/KWH (lower heating value, gross plant output) is achieved. The gross plant output and net output are 160.0 MW and 155.2 MW, respectively, with the steam turbine operating at 1465 psig/1000 degrees Fahrenheit/1000 degrees Fahrenheit to produce 69.3 MW. Increased consumption in fuel and outside air account for the difference in efficiency. Relative to the previous arrangement, the burner exhaust flow has increased to 542.5 KLB/H at 660 degrees Fahrenheit. The bypass exhaust flow has decreased to 814.0 KLB/H at 660 degrees Fahrenheit. Outside air at 88 degrees and relative humidity of 80 percent is preheated to 300 degrees Fahrenheit and is delivered to and blended with the burner exhaust flow at an increased rate of 96.5 KLB/H. No. 6 heavy fuel oil is provided to the burner at the increased rate of 482.2 MBTU/H/17233.0 BTU/LB.

It must be appreciated that the method of the present invention may be performed in a variety of ways, only some of which have been fully described above. Without departing from its spirit or essential character, the invention may be performed in other ways. The foregoing is to be considered in all respects only as illustrative and non-restrictive, and the scope of the invention is, therefore, described by the appended claims rather than by the foregoing description. All changes which come within the meaning and range of equivalency of the claims are embraced within their scope.

What I claim is:

1. A method of operating a combined cycle power plant comprising an internal combustion engine, a burner, and a boiler space, the method comprising:

routing a first portion of exhaust from the internal combustion engine to the boiler space by a route other than through the burner;

routing fuel through a primary burner outlet in an amount sufficient to achieve a desired average boiler entering temperature upon its combustion;

providing a second portion of exhaust from the internal combustion engine for eventual routing through at least one outlet of the burner other than the primary burner outlet;

blending an amount of air with the second portion of exhaust such that the blend of air and exhaust contains about the minimum level of oxygen appropriate for complete and stable combustion of the fuel;

routing the blend of air and exhaust through the at least one outlet of the burner; and combusting the fuel.

2. The method of claim 1 where the first portion of exhaust is at least about 60 percent of all exhaust routed to the boiler space.

3. The method of claim 2 where the first portion of exhaust is up to about 80 percent of all exhaust routed to the boiler space.

4. The method of claim 1 where the first portion of exhaust is at least about 54 percent of the total mass of all gas entering the boiler space.

5. The method of claim 4 where the first portion of exhaust is up to about 76 percent of the total mass of all gas entering the boiler space.

6. The method of claim 5 where the internal combustion engine is a diesel engine.

7. The method of claim 6 where the air is heated prior to blending it with the second portion of exhaust.

8. The method of claim 7 where the fuel is blended with an amount of carrier air prior to combustion.

9. The method of claim 8 where a reducing atmosphere is maintained in a portion of a combustion zone.

10. The method of claim 8 where combustion of the fuel proceeds in stages.

11. The method of claim 8 where no exhaust from the internal combustion engine is routed through the primary burner outlet.

12. The method of claim 5 where the first portion of exhaust enters the boiler space downstream of a combustion zone.

13. A method of operating a combined cycle power plant comprising an internal combustion engine, a burner, and a boiler space, the method comprising:

routing a first portion of exhaust from the internal combustion engine to the boiler space by a route other than through the burner;

routing fuel through a primary burner outlet;

providing a second portion of exhaust from the internal combustion engine for eventual routing through at least one outlet of the burner other than the primary burner outlet;

blending an amount of air with the second portion of exhaust such that the blend of air and exhaust contains about the minimum level of oxygen appropriate for complete and stable combustion of the fuel;

routing the blend of air and exhaust through the at least one outlet of the burner; and combusting the fuel, where the first portion of exhaust is at least about 54 percent of the total mass of all gas entering the boiler space.

14. The method of claim 13 where the first portion of exhaust is up to about 76 percent of the total mass of all gas entering the boiler space.

15. The method of claim 14 where the first portion of exhaust is at least about 60 percent of all exhaust routed to the boiler space.

16. The method of claim 15 where the first portion of exhaust is up to about 80 percent of all exhaust routed to the boiler space.

17. The method of claim 13 where the fuel is about the minimum amount of fuel necessary to achieve a desired average boiler entering temperature upon its combustion.

18. A method of operating a combined cycle power plant comprising an internal combustion engine, a burner, and a boiler space, the method comprising:

routing a first portion of exhaust from the internal combustion engine to the boiler space by a route other than through the burner;

routing fuel through a primary burner outlet in an amount sufficient to achieve a desired average boiler entering temperature upon its combustion;

providing a second portion of exhaust from the internal combustion engine for eventual use as secondary or higher level combustion gas;

blending an amount of air with the second portion of exhaust such that the blend of air and exhaust contains about the minimum level of oxygen appropriate for complete and stable combustion of the fuel;

providing the blend of air and exhaust as secondary or higher level combustion gas; and combusting the fuel.

19. The method of claim 18 where the first portion of exhaust is at least about 60 percent of all exhaust routed to the boiler space.

20. The method of claim 19 where the first portion of exhaust is up to about 80 percent of all exhaust routed to the boiler space.

21. The method of claim 18 where the first portion of exhaust is at least about 54 percent of the total mass of all gas entering the boiler space.

22. The method of claim 21 where the first portion of exhaust is up to about 76 percent of the total mass of gas entering the boiler space.

23. The method of claim 22 where the blend of air and exhaust is provided as secondary and tertiary combustion gas.

24. The method of claim 23 where the amounts of oxygen in the secondary and tertiary combustion gases are not the same.

* * * * *